(12) United States Patent
Zizzamia et al.

(10) Patent No.: US 8,200,511 B2
(45) Date of Patent: Jun. 12, 2012

(54) METHOD AND SYSTEM FOR DETERMINING THE IMPORTANCE OF INDIVIDUAL VARIABLES IN A STATISTICAL MODEL

(75) Inventors: Frank M. Zizzamia, Canton, CT (US); Cheng-Sheng Peter Wu, Arcadia, CA (US); Raymond E. Stukel, Elmhurst, IL (US); Hrisanthi Adamopoulos, Wethersfield, CT (US); John R. Lucker, Simsbury, CT (US)

(73) Assignee: Deloitte Development LLC, Hermitage, TN (US)

( * ) Notice: Subject to any disclaimer, the term of this patent is extended or adjusted under 35 U.S.C. 154(b) by 1155 days.

(21) Appl. No.: 09/996,065

(22) Filed: Nov. 28, 2001

(65) Prior Publication Data

US 2003/0101080 A1    May 29, 2003

(51) Int. Cl.
*G06Q 40/00*   (2006.01)
(52) U.S. Cl. .................................. 705/4; 705/2; 705/3
(58) Field of Classification Search ........................ 705/4
See application file for complete search history.

(56) References Cited

U.S. PATENT DOCUMENTS

| | | | |
|---|---|---|---|
| 4,766,539 A | 8/1988 | Fox | |
| 4,831,526 A | 5/1989 | Luchs et al. | |
| 4,837,693 A * | 6/1989 | Schotz ............... | 705/4 |
| 4,975,840 A | 12/1990 | DeTore et al. | |
| 5,191,522 A | 3/1993 | Bosco et al. | |
| 5,613,072 A * | 3/1997 | Hammond et al. ............... | 705/4 |
| 5,692,107 A | 11/1997 | Simoudis et al. | |
| 5,752,236 A | 5/1998 | Sexton et al. | |
| 5,774,883 A | 6/1998 | Andersen et al. | |
| 5,809,478 A | 9/1998 | Greco et al. | |
| 5,819,266 A | 10/1998 | Agrawal et al. | |
| 5,839,113 A | 11/1998 | Federau et al. | |
| 5,884,275 A | 3/1999 | Peterson et al. | |
| 5,893,072 A | 4/1999 | Zizzamia | |
| 5,937,387 A * | 8/1999 | Summerell et al. ............... | 705/2 |
| 5,956,691 A * | 9/1999 | Powers ............................ | 705/4 |
| 970,464 A | 10/1999 | Apte et al. | |
| 6,003,020 A | 12/1999 | Hazlehurst et al. | |
| 6,009,415 A | 12/1999 | Shurling et al. | |
| 6,014,632 A | 1/2000 | Gamble et al. | |
| 6,038,554 A | 3/2000 | Vig | |
| 6,076,072 A | 6/2000 | Libman | |
| 6,128,599 A | 10/2000 | Walker et al. | |

(Continued)

OTHER PUBLICATIONS

Dionne, Georges. "Handbook of Insurance" Copyright 2000. Kluwer Academic Publishers Group.

(Continued)

*Primary Examiner* — R. David Rines
(74) *Attorney, Agent, or Firm* — Kramer Levin Naftalis & Frankel LLP (57) ABSTRACT

A method and system for determining the importance of each of the variables that contribute to the overall score of a model for predicting the profitability of an insurance policy. For each variable in the model, an importance is calculated based on the calculated slope and deviance of the predictive variable. Since the score is developed using complex mathematical calculations combining large numbers of parameters with predictive variables, it is often difficult to interpret from the mathematical formula for example, why some policyholders receive low scores while other receive high scores. Such clear communication and interpretation of insurance profitability scores is critical if they are used by the various interested insurance parties including policyholders, agents, underwriters, and regulators.

15 Claims, 5 Drawing Sheets

U.S. PATENT DOCUMENTS

| | | | |
|---|---|---|---|
| 6,148,297 | A | 11/2000 | Swor et al. |
| 6,173,280 | B1 | 1/2001 | Ramkumar et al. |
| 6,182,048 | B1 * | 1/2001 | Osborn et al. .................... 705/4 |
| 6,236,975 | B1 | 5/2001 | Boe et al. |
| 6,456,979 | B1 | 9/2002 | Flagg |
| 6,473,084 | B1 | 10/2002 | Phillips et al. |
| 6,725,210 | B1 | 4/2004 | Key et al. |
| 7,392,201 | B1 | 6/2008 | Binns et al. |
| 2002/0116231 | A1 * | 8/2002 | Hele et al. ......................... 705/4 |
| 2002/0133441 | A1 * | 9/2002 | Tanaka ............................ 705/35 |
| 2002/0188480 | A1 * | 12/2002 | Liebeskind et al. ............. 705/4 |

OTHER PUBLICATIONS

Clapp, John M., Fields, Joseph A., Ghosh, Chinmoy. "An Examination of Profitablity in Spatial Markets: The Case of Life Insurance Agency Locations" Sep. 1990.

* cited by examiner

| Variable | Description |
|---|---|
| $X_1$: | Symbol of the most expensive vehicles on the policy |
| $X_2$: | Vehicle age of the oldest vehicle on the policy |
| $X_3$: | Total number of drivers |
| $X_4$: | Total number of driver safety surcharge points in the past three years |
| $X_5$: | Total number of minor traffic violations other than speeding on the policy in the past three years |
| $X_6$: | Total number of no-fault incidences on the policy in the past three years |
| $X_7$: | Total number of comprehensive loss claims on the policy in the past three years |
| $X_8$: | Total number of at-fault accidents on the policy in the past three years |
| $X_9$: | Total number of speeding violations on the policy in the past three years |
| $X_{10}$: | Total number of major traffic violations other than speeding on the policy in the past three years |
| $X_{11}$: | Age of the youngest driver on the policy |
| $X_{12}$: | Total number of vehicles on the policy |
| $X_{13}$: | Gender of the youngest driver on the policy |
| $X_{14}$: | Financial credit score of the primary insured on the policy |
| $X_{15}$: | Bodily injury coverage limit |
| $X_{16}$: | Comprehensive coverage deductible |
| $X_{17}$: | Ranking of the average annual number of tornadoes experienced in the insured party's county |

Fig. 3

| Variable | Assumption | Mean Value | Standard Deviation |
|---|---|---|---|
| Y: | The higher the loss ratio, the worse the profitability. | .54 | |
| $X_1$: | The higher the symbol scale, the more expensive the vehicle. | 14.4 | 5.2 |
| $X_2$: | None | 4.9 | 3.8 |
| $X_3$: | None | 1.44 | 0.65 |
| $X_4$: | The higher the points, the more accident and violation safety points being charged to the policy. | 0.97 | 2.00 |
| $X_5$ | None | 0.27 | 0.61 |
| $X_6$: | None | 0.10 | 0.36 |
| $X_7$: | None | 0.07 | 0.32 |
| $X_8$: | None | 0.23 | 0.55 |
| $X_9$: | None | 0.49 | 0.90 |
| $X_{10}$: | None | 0.11 | 0.40 |
| $X_{11}$: | None | 38.7 | 13.3 |
| $X_{12}$: | None | 1.7 | 0.72 |
| $X_{13}$: | The value is 0 or 1: 0 = female and 1 = male | 0.61 | 0.49 |
| $X_{14}$: | The higher the credit score the worse the credit history | 709 | 245 |
| $X_{15}$: | The value is 0 or 1: 0 = basic limit and 1 = higher than basic limit | 0.49 | 0.76 |
| $X_{16}$: | The value is 0 or 1: 0 = other than $250 deductible and 1=$250 deductible | 0.58 | 0.79 |
| $X_{17}$: | The ranking is from 1 to 10. The higher the ranking, the more tornadoes. | 5.6 | 2.7 |

Fig. 4

| 1 | 2 | 3 | 4 | 5 | 6 |
|---|---|---|---|---|---|
| Variable | Value ($X_i$) | Slope | Deviance, $(x-\mu)/\sigma$ | Importance = Slope*Deviance | Rank |
| $X_1$ | 23 | 0.0061 | 1.65 | 0.0100 | #5 |
| $X_2$ | 4 | -0.01062 | -0.24 | 0.0025 | #8 |
| $X_3$ | 1 | 0.00593 | -0.68 | -0.0040 | #14 |
| $X_4$ | 10 | -0.00334 | 4.50 | -0.0150 | #16 |
| $X_5$ | 1 | 0.01103 | 1.20 | 0.0132 | #4 |
| $X_6$ | 2 | 0.07523 | 5.30 | 0.3970 | #2 |
| $X_7$ | 0 | 0.04857 | -0.22 | -0.0106 | #15 |
| $X_8$ | 0 | 0.02741 | -0.42 | -0.0115 | #17 |
| $X_9$ | 1 | 0.01060 | 0.57 | 0.0060 | #7 |
| $X_{10}$ | 3 | 0.06106 | 7.20 | 0.4410 | #1 |
| $X_{11}$ | 29 | -0.00242 | -0.73 | 0.0018 | #9 |
| $X_{12}$ | 1 | -0.06216 | -0.97 | 0.0604 | #3 |
| $X_{13}$ | 1 | 0.01088 | 0.80 | 0.0087 | #6 |
| $X_{14}$ | 1261 | 0.000403 | 2.30 | 0.00091 | #11 |
| $X_{15}$ | 0 | -0.00194 | -0.64 | 0.0013 | #10 |
| $X_{16}$ | 1 | -0.0017 | 0.53 | -0.00090 | #12 |
| $X_{17}$ | 1 | 0.000704 | -1.70 | -0.0012 | #13 |

Fig. 5

METHOD AND SYSTEM FOR DETERMINING THE IMPORTANCE OF INDIVIDUAL VARIABLES IN A STATISTICAL MODEL

BACKGROUND OF THE INVENTION

The present invention is directed to a method and system for evaluating the results of a predictive statistical scoring model and more particularly to a system and method that determines the contribution of each of the variables that comprise the predictive scoring model to the overall score generated by the model.

Insurance companies provide coverage for many different types of exposures. These include several major lines of coverage, e.g., property, general liability, automobile, and workers compensation, which include many more types of subcoverage. There are also many other types of specialty coverages. Each of these types of coverage must be priced, i.e., a premium selected that accurately reflects the risk associated with issuing the coverage or policy. Ideally, an insurance company would price the coverage based on a policyholder's actual future losses. Since a policyholder's future losses can only be estimated, an element of uncertainty or imprecision is introduced in the pricing of a particular type of coverage such that certain policies are priced correctly, while others are under-priced or over-priced.

In the insurance industry, a common approach to pricing a policy is to develop or create complex scoring models or algorithms that generate a value or score that is indicative of the expected future losses associated with a policy. The predictive scoring models are used to price coverage for a new policyholder or an existing policyholder. As is known, multivariate analysis techniques such as linear regression, non-linear regression, and neural networks are commonly used to model insurance policy profitability. A typical insurance profitability application will contain many predictive variables. A profitability application may be comprised of thirty to sixty different variables contributing to the analysis.

The potential target variables in such models can include frequency (number of claims per premium or exposure), severity (average loss amount per claim), or loss ratio (loss divided by premium). The algorithm or formula will directly predict the target variable in the model. The scoring formula contains a series of parameters that are mathematically combined with the predictive variables for a given policyholder to determine the predicted profitability or final score. Various mathematical functions and operations can be used to produce the final score. For example, linear regression uses addition and subtraction operations, while neural networks involve the use of functions or options that are more complex such as sigmoid or hyperbolic functions and exponential operations.

In creating the predictive model, often the predictive variables that comprise the scoring formula or algorithm are selected from a larger pool of variables for their statistical significance to the likelihood that a particular policyholder will have future losses. Once selected from the larger pool of variables, each of the variables in this subset of variables is assigned a weight in the scoring formula or algorithm based on complex statistical and actuarial transformations. The result is a scoring model that may be used by insurers to determine in a more precise manner the risk associated with a particular policyholder. This risk is represented as a score that is the result of the algorithm or model. Based on this score, an insurer can price the particular coverage or decline coverage, as appropriate.

As noted, the problem of how to adequately price insurance coverage is challenging, often requiring the application of complex and highly technical actuarial transformations. These technical difficulties with pricing coverages are compounded by real world marketplace pressures such as the need to maintain an "ease-of-business-use" process with policyholders and insurers, and the underpricing of coverages by competitors attempting to buy market share. Notwithstanding the recognized value of these pricing models and their simplicity of use, known models provide insurers with little information as to why a particular policyholder received his or her score. Consequently, insurers are unable to advise policyholders with any precision as to the reason a policyholder has been quoted a high premium, a low premium, or why, in some instances, coverage has been denied. This leaves both insurers and policyholders alike with a feeling of frustration and almost helpless reliance on the model that is used to determine pricing.

While predictive scoring models are available in the insurance industry to assist insurers in pricing insurance coverage, there is still a need for a method and system to that overcomes the foregoing shortcomings in the prior art. Accordingly, there exists a need for a system and method to interpret the results of any scoring model used in the insurance industry to price coverage. Indeed, the system and method may be used to interpret the results of any complex formula. There is especially a need for a system and a method that allow an insurer to determine and rank the contribution of each of the individual predictive variables to the overall score generated by the scoring model. In this manner, insurers and policyholders alike may know with certainty the factors or variables that most influenced the premium paid or price of an insurance policy.

SUMMARY OF THE INVENTION

It is an object of the present invention to address and overcome the deficiencies of the prior art by providing a system and a method for interpreting the results of a scoring model used to price insurance coverage.

It is another object of the invention to provide a system and a method that determine the significance or contribution of each predictive variable to the score generated by such a scoring model.

It is another object of the invention to provide a system and a method that permit insurers to rank the variables according to their significance or contribution to such overall score.

It is still another object of the present invention to provide a system and method that allow insurers to utilize the rank information to inform potential or existing policyholders of those variables that most influenced or affected the pricing.

Accordingly, in one aspect of the invention a method is provided of evaluating the scoring formula or algorithm to determine the contribution of each of the individual predictive variables to the overall score generated by the scoring model. For example, in the commercial auto industry, sophisticated scoring models are created for predicting the profitability of issuing a particular policy based on variables that have been determined to be predictive of profitability. These predictive variables may include the age of the vehicle owner, total number of drivers, speeding violations and the like. In a scoring algorithm having over a dozen variables, the analysis or their individual contributions to the overall score would be very difficult without the present invention.

In another aspect of the present invention, in a system that employs a statistical model comprised of a scoring formula having a plurality of predictive variables for generating a score that is representative of a risk associated with an insurance policyholder and for pricing a particular coverage based on the score, a method is provided of quantifying the contribution of each of the plurality of predictive variables to the score generated by the model including the steps of populating a database associated with the system with a mean value and standard deviation value for each of the plurality of variables, calculating a slope value for each of the plurality of variables, calculating a deviance value based on the slope and standard deviation for each of the plurality of variables, and multiplying the deviance value and slope value for each of the plurality of variables to quantify the contribution of each of the plurality of variables to the score. This quantified contribution may then be used to rank the variables by importance to the overall score.

Additional objects, features and advantages of the invention appear from the following detailed disclosure.

The present invention accordingly comprises the various steps and the relation of one or more of such steps with respect to each of the others, and the product which embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

The invention described herein creates an explanatory system and method to quantitatively interpret the contribution or significance of any particular variable to a policyholder's profitability score (hereinafter the "Importance"). The methodology of the present invention considers both a) the overall impact of a variable to the scoring model as well as b) the particular value of each variable in determining its Importance to the final score.

Figure 1:
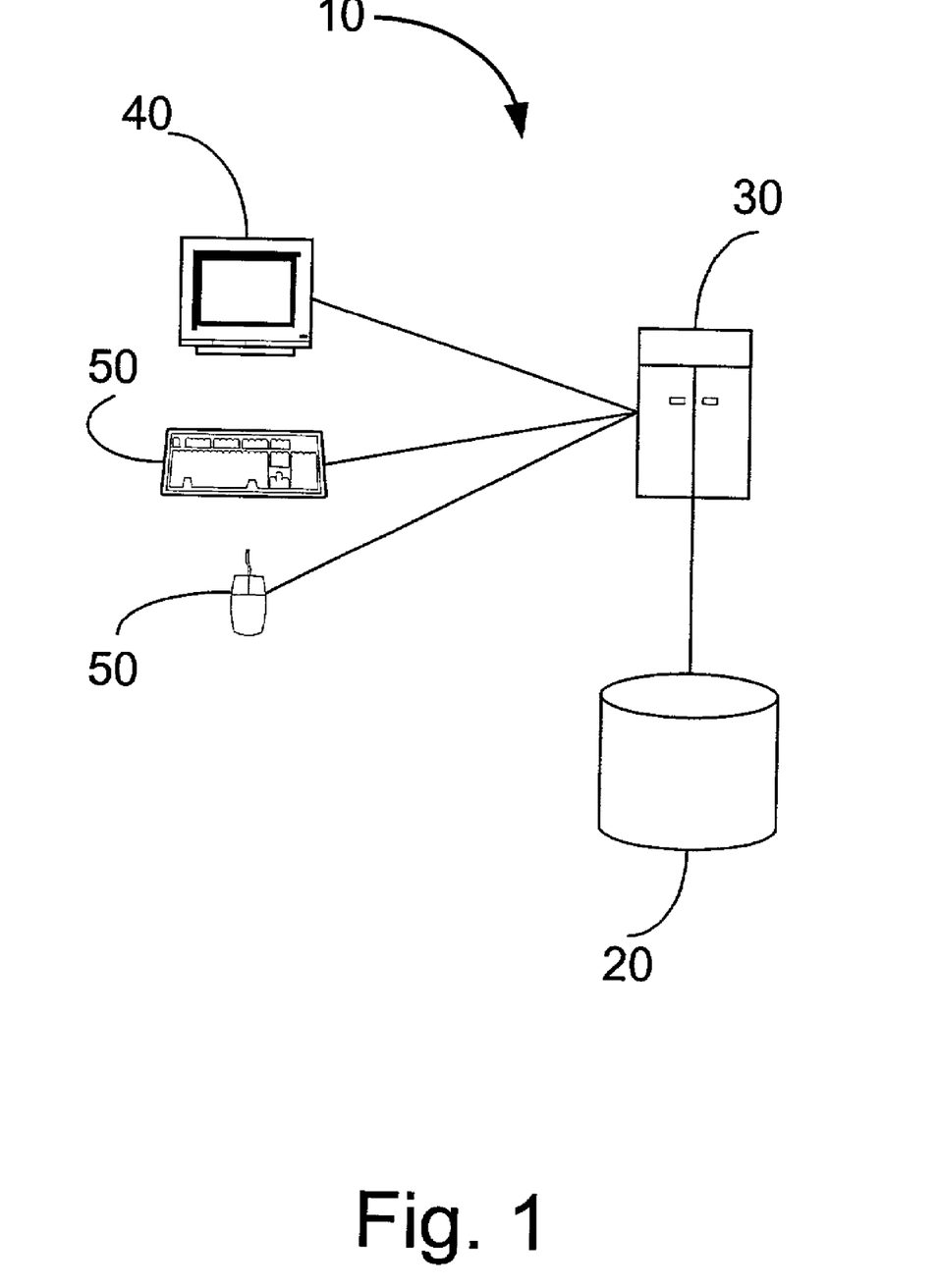
FIG. 1 illustrates a system that may be used to interpret and rank the predictive variables according to an exemplary embodiment of the present invention.

As is known, scoring models are developed and used by the insurance industry (as well as other industries) to set an ideal price for a coverage. Many off-the-shelf statistical programs and applications are known to assist developers in creating the scoring models. Once created relatively standard or common computer hardware may be used to store and run the scoring model. FIG. 1 illustrates an exemplary system 10 that may be employed to implement a scoring model and calculate the Importance of individual predictive variables according to an exemplary embodiment of the present invention. Referring to FIG. 1, the system includes a database 20 for storing the values for each of the variables in the scoring formula, a processor 30 for calculating the target variable in the scoring algorithm as well as the values associated with the present invention, monitor 40 and input/output means 50 (i.e., keyboard and mouse). Alternatively, the system 10 may housed on a stand alone personal computer having a processor, storage means, monitor and input/output means.

Figure 2:
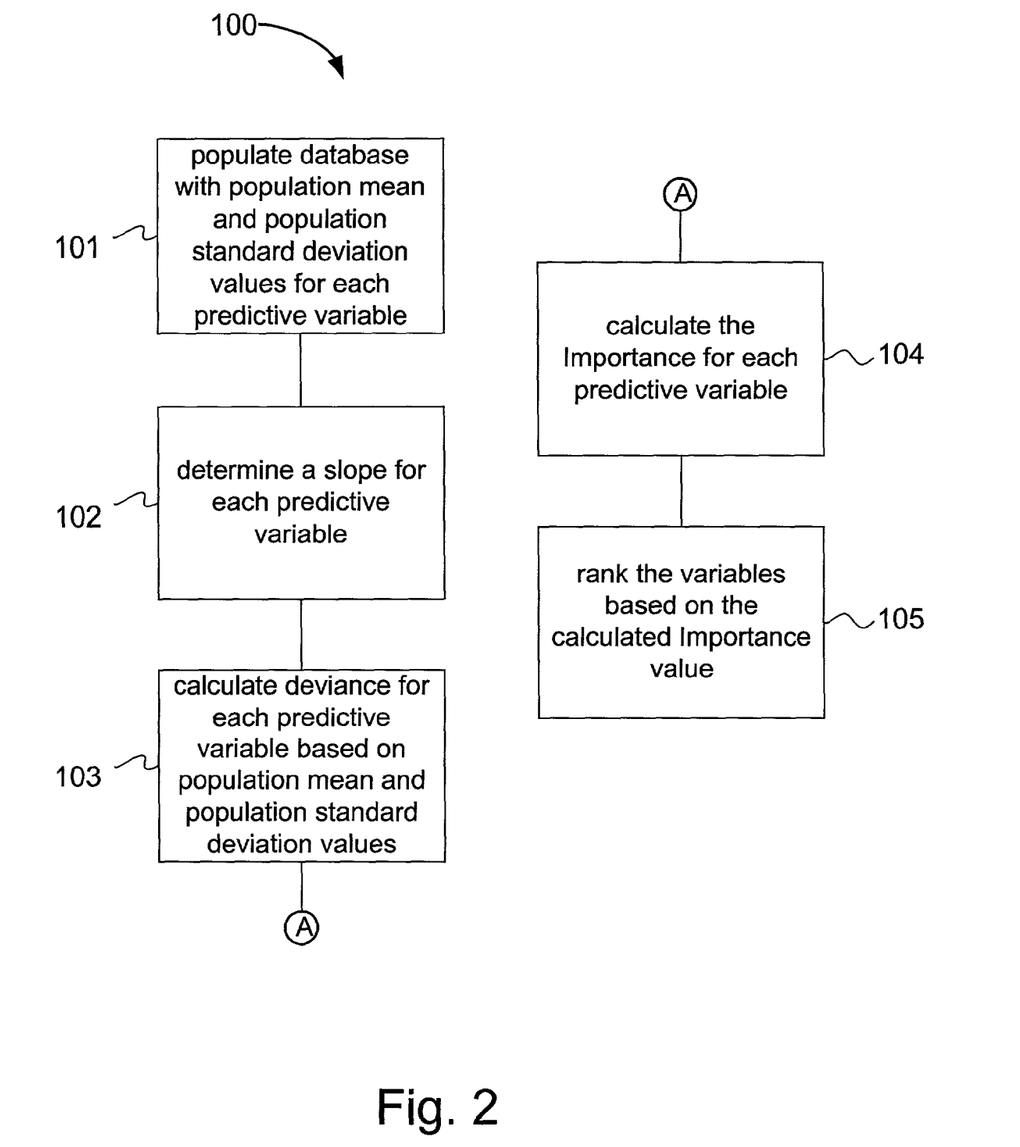
FIG. 2 is a flow diagram depicting the steps carried out in interpreting the contribution of each of the predictive external variables in a scoring model according to an exemplary embodiment of the present invention.

Referring to FIG. 2, the steps of a method according to an exemplary embodiment of the present invention are shown generally as 100. The method assumes a model has been generated utilizing one of many statistical and actuarial techniques briefly discussed herein and known in the art. The model is typically a scoring formula or algorithm comprised of a plurality of weighted variables. The database 20 is populated with values for the variables that define the scoring model. These values in the database are used by the scoring model to generate the profitability score. It should be noted that some of the values might be supplied as a separate input from an external source or database.

Similarly, in step 101, the database 20 or a different database is populated with values for the population mean and standard deviation for each of the predictive variables. These values will be used in calculating the Importance as will be described. Next, in step 102, the slope for each predictive variable in the scoring model is determined. As discussed below, this may be simply done in a scoring mode or require a separate calculation. In step 103, a deviance is calculated. After the deviance is calculated, in step 104, the Importance is calculated for each variable by multiplying the slope by the deviance. The variables are then ranked by Importance in step 105. The higher the value the more important the variable was toward the overall profitability score.

Steps 102 through 104 are now explained in more detail:

Step 102

The first criterion in determining the most important variables for a particular score is the impact that each variable contributes to the overall scoring formula. Mathematically, such impact is given by the slope of the scoring function with respect to the variable being analyzed. To calculate the slope, the first derivative of the formula with respect to the variable is generated. For a nonlinear profitability formula such as a neural network formula or a nonlinear regression formula, the slope may be different from one data point (i.e. policyholder) to the next. Therefore, the average of the slope across all of the data points is used as the first criteria to measure Importance.

Since the first derivative can be either positive or negative for each data point and since the impact should be treated equally regardless of the sign of the slope, it is necessary to calculate the average of the first derivative and then take the absolute value of the average. In summary, the first criteria in determining the most important variables can be represented as follows:

$$\text{Slope of Predictive Variable } x_i = \left| avg\left(\frac{\partial F(X)}{\partial x_i}\right)\right|$$

(where $F(X)$ is the scoring function which depends on a number of predictive variables, $x_i$, i=1,2,3 ... n.b).

This technique is also directly applicable to the linear regression model results. However, in a linear regression model, the slope of a variable is constant (same sign and same value) across all of the data points and therefore the average is simply equal to the value of the slope at any particular point.

Step 103

Although the slope impact of a predictive variable as determined in Step 102 is applied to every data point, it is expected that the Importance of any particular variable will be different from one data point to another. Therefore, the overall Importance of a variable should include a measure of its value for each specific policyholder as well as the overall average value determined in Step 102. For example, if the value of a variable deviates "significantly" from the general population mean for a given policyholder, the conclusion might be that the variable played a significant role in determining why that policy received its particular score. On the other hand, if the value of a particular variable for a chosen policy is close to the overall population mean, it should not be judged to have an influential impact on the score, even if the average value of the variable impact (from Step 102) is large, because its value for that policy is similar to the majority of the population.

Therefore, the second criterion in measuring Importance, Deviance, is a measure of how similar or dissimilar a variable is relative to the population mean. Deviance may be calculated using the following formula:

$$\text{Deviance of } x_i = \frac{(x_i - \mu_i)}{\sigma_i}$$

where $\mu_1$ is the mean for $x_i$ and $\sigma_1$ is the standard deviation for predicitve variable $x_i$.

Step 104

The final step, 105, defines the importance of a predictive variable as the product of the slope (Step 1) and the deviance (Step 2) of the variable:

Importance=Slope*Deviance

For each policy that is scored, the Importance of each variable is calculated according to the above methodology. The predictive variables are then sorted for every policy according to their Importance measurement to determine which variables contributed the most to the predicted profitability.

Figure 3:
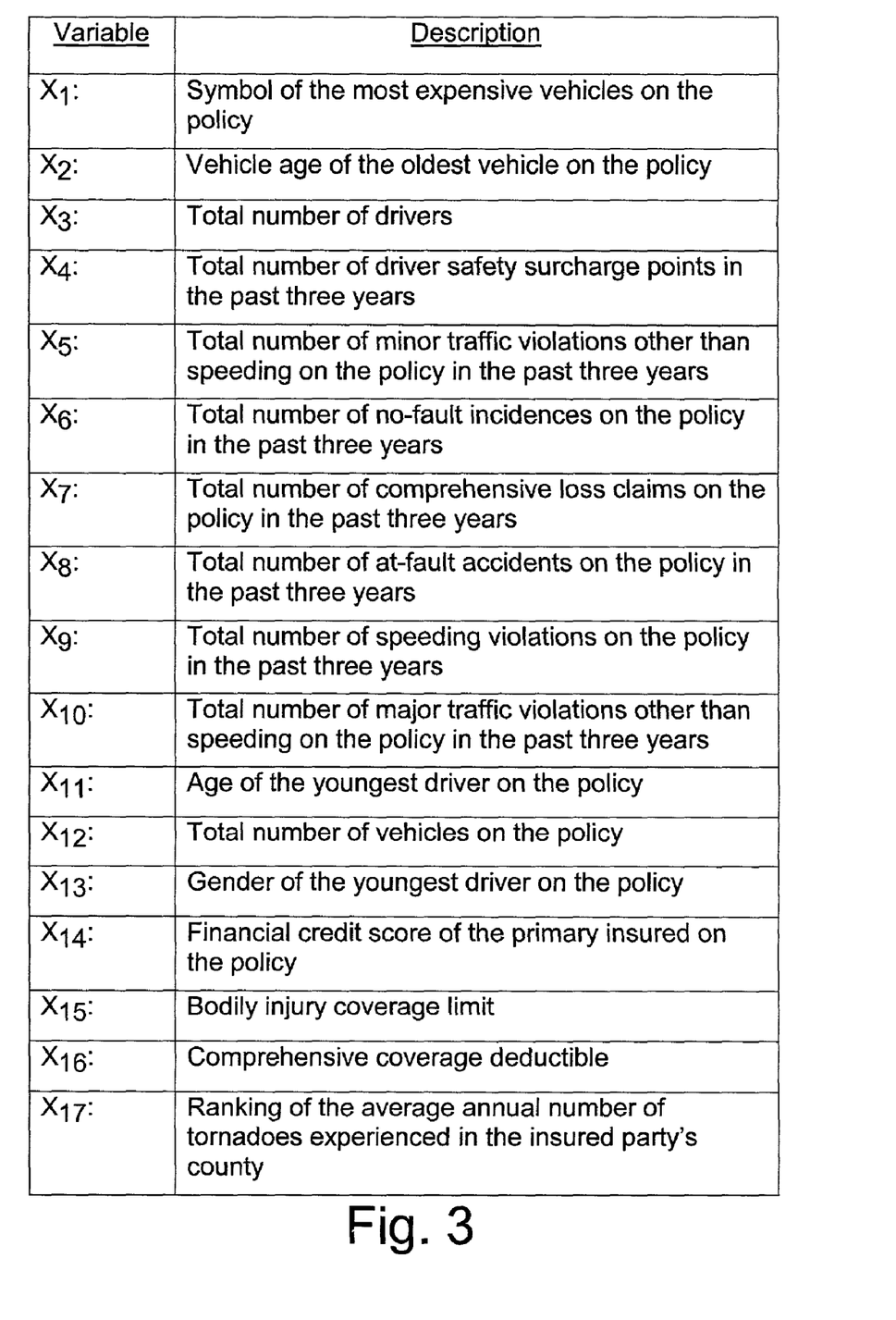
FIG. 3 specifies the description of the variables in an example illustrating the application of the method of the present invention to an exemplary scoring formula.
Figure 4:
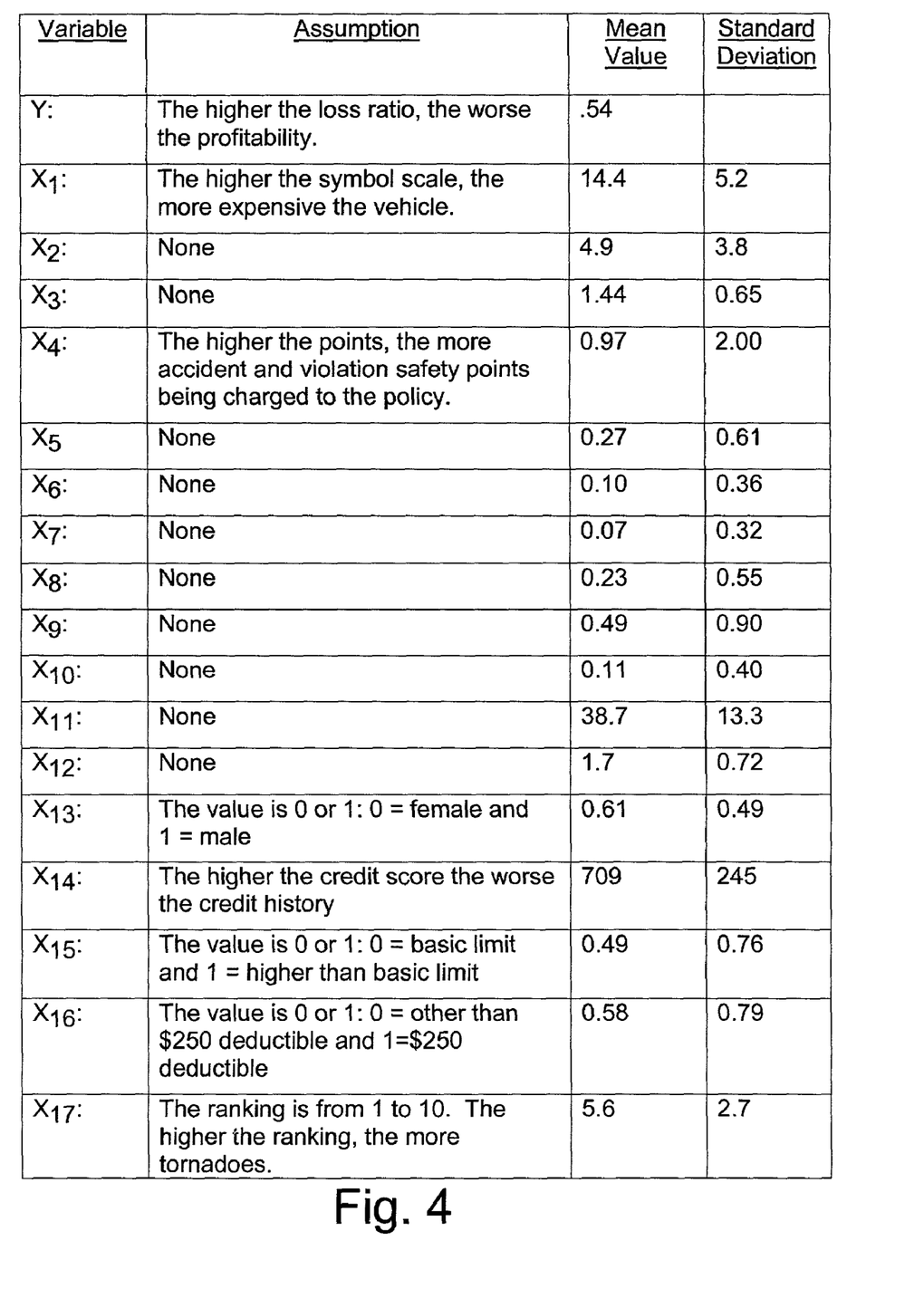
FIG. 4 specifies assumptions made regarding the variables in the exemplary scoring formula.
Figure 5:
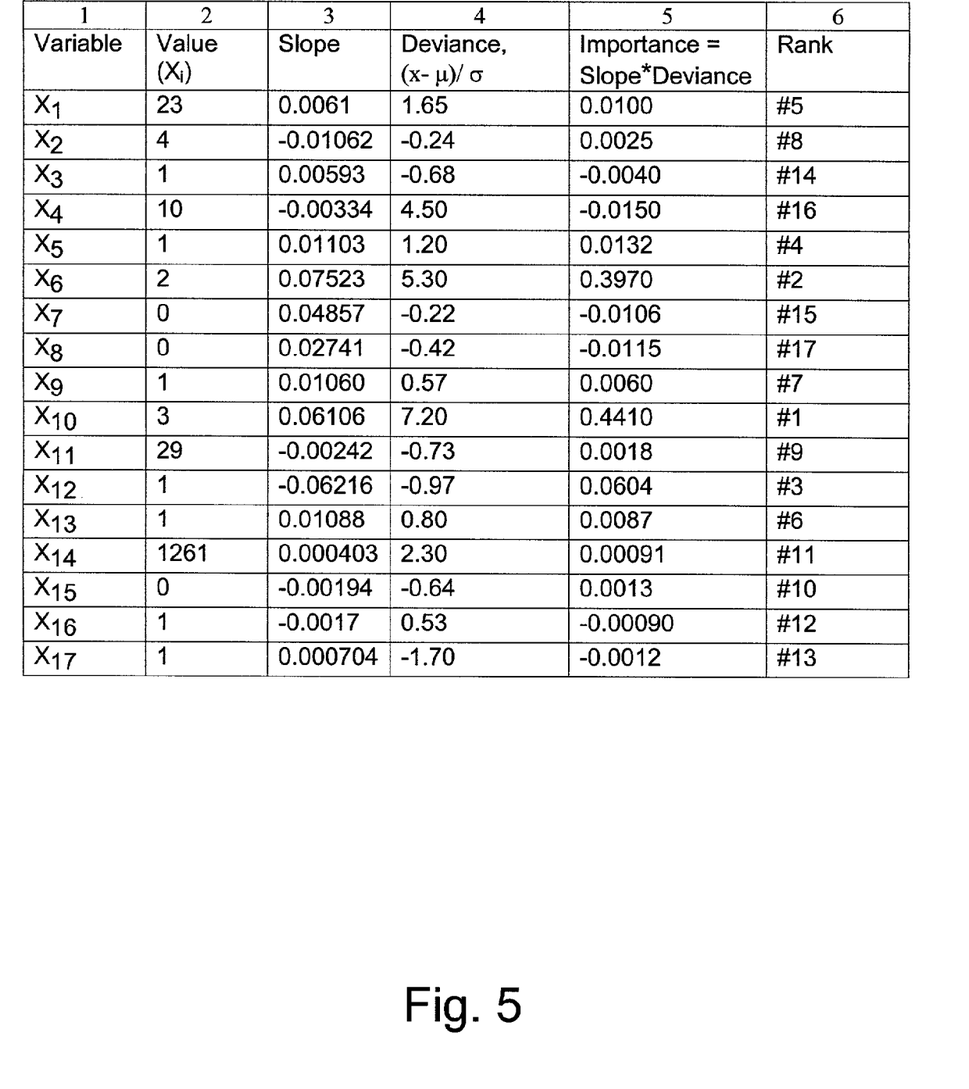
FIG. 5 specifies the values for the variables used in the exemplary scoring formula, the application of the method of the present invention and the results thereof.

Referring to FIGS. 3 through 5, the Importance calculation is applied to an exemplary situation illustrating the usage of the proposed Importance calculation in a typical multivariate auto insurance scoring formula. In the example, the following should be assumed: (i) a personal automobile book of business is being analyzed, and (ii) the book has a large quantity of data, e.g., 40,000 data points, available for the analysis. In this example, a linear regression formula is used for its simplicity. As described in more detail below, the scoring formula is given as follows:

$Y = 0.376 + 0.0061X_1 - 0.106X_2 + 0.00593X_3 - 0.00334X_4 +$ $0.011X_5 + 0.075X_6 + 0.049X_7 + 0.027X_8 + 0.0106X_9 +$ $0.061X_{10} - 0.00242X_{11} - 0.062X_{12} + 0.0109X_{13} +$ $0.000403X_{14} - 0.00194X_{15} - 0.0017X_{16} + 0.000704X_{17}$

In the above scoring formula, the target variable, Y, will predict the loss ratio (loss/premium) for a personal automobile policy. A multivariate technique, which can be a traditional linear regression or a more advanced nonlinear technique such as nonlinear regression or neural networks, was used to develop the scoring formula. The formula uses seventeen (17) driver and vehicle characteristics to predict the loss ratio, which are described in FIG. 3.

Any assumptions made for the variables are specified in FIG. 4. For each variable, the information gives a further description of the possible values for each variable based on the total population of the data points used in the model development and stored in database 20. Additionally, FIG. 4 specifies the Mean of the modeling data population and Standard Deviation for each variable.

This example illustrates a "bad" (predicted to be unprofitable) policy having the values for the particular variables specified in FIG. 5. The scoring formula contains a constant term, 0.376, and a parameter for each predictive variable. When the parameter is positive, it indicates that the higher the variable, the higher the Y and hence the worse the predicted profitability. When the parameter is negative, it indicates the opposite. For example, the parameter for vehicle age, $X_2$, is −0.0106. This suggests that the older the vehicle, the lower the Y and the better the profitability. It also suggests that as the vehicle age increases by 1 year, the Y will decrease by 0.0106. On the other hand, the parameter for the number of minor traffic violation, $X_5$, is 0.011. This suggests that the more the violations, the higher the Y and the worse the profitability. It also suggests that as the number of the violation increases by one, the Y will increase by 0.011.

Referring to FIG. 5, the solution of the model indicates that the policy has a predicted loss ratio score of 1.19, which is more than twice the population average of 0.54. A close review of the seventeen (17) predictive variables further indicates that it has many bad characteristics. For example, it has a number of accidents and violations ($X_5$, $X_6$, $X_9$). It also has a very high number of safety surcharge points ($X_4$) as well as a bad financial credit score ($X_{14}$). Also, the vehicle is very expensive ($X_1$) and the driver is relatively young ($X_{11}$).

While the policy is obviously a bad policy, the unanswered question is which of the seventeen (17) variables are the key driving factors for the bad score? Are the ten (10) driver safety points the number one reason, or the three (3) major violations the number one reason for such a bad score? In addition, what are the top 5 most important reasons? In order to address these questions, the Importance of each variable is calculated using the method described above and in FIG. 2. The first step (102) is to calculate the slope of each predictive variable:

$$\text{Slope of Predictive Variable } x_i = \left| avg\left(\frac{\partial F(X)}{\partial x_i}\right) \right|$$

Since the scoring formula used in the example is a linear formula, the slope is the same as the parameter or coefficient preceding each variable in the scoring formula, as illustrated in column 3 of FIG. 5. The next step (103) is to calculate the deviance for each predictive variable:

$$\text{Deviance of } x_i = \frac{(x_i - \mu_i)}{\sigma_i}$$

where $\mu_1$ is the mean for $x_i$ and $\sigma_1$ is the standard deviation for predicitve variable $x_1$.

The value ($X_i$) for each variable for the sample policy is given in the second column, and the population mean and the population standard deviation are given in columns 3 and 4 of FIG. 4. The calculated slope and deviance for each variable are shown in columns 3 and 4, respectively, of FIG. 5. The next step (104) is to calculate the Importance, which is the product of slope and deviance. The calculated importance is given in column 5 of FIG. 5. In a final step (105), from the calculated value of the Importance, the variables can be ranked from highest to lowest value as shown in column 6 of FIG. 5.

The ranking is directly translated into a reasons ranking. From column 6, it can be see that the most important reason why the sample policy is a "bad" policy is because the policy has three major traffic ($X_{10}$) violations, compared to the average 0.11 violations for the general population. The second most important reason is that the policy has two no-fault incidences ($X_6$), while the general population on average only has 0.1 violations.

When these two variables are compared to the other fifteen (15) variables, it becomes clear that this policy has values for these two variables that are very different from the general population, as indicated by the high value of deviance. In addition, the parameters (the slopes) for these two variables are also very high, indicating that both variables have a significant impact on the predicted loss ratio and profitability of the policy. In the case of these two variables, the high values of both the slope and the deviance causes these two variables to emerge as the top two most Important factors to explain the bad score for the policy.

With the foregoing method and system an easy-to-understand explanation of which variables are most significant to the score (i.e., Importance) is made available to non-technical end users. Such clear communication and interpretation of insurance profitability scores is critical if they are used by the various interested insurance parties including policyholders, agents, underwriters, and regulators.

In so far as embodiments of the invention described herein may be implemented, at least in part, using software controlled programmable processing devices, such as a computer system, it will be appreciated that one or more computer programs for configuring such programmable devices or system of devices to implement the foregoing described methods are to be considered an aspect of the present invention. The computer programs may be embodied as source code and undergo compilation for implementation on processing devices or a system of devices, or may be embodied as object code, for example. Those of ordinary skill will readily understand that the term computer in its most general sense encompasses programmable devices such as those referred to above, and data processing apparatus, computer systems and the like.

Preferably, the computer programs are stored on carrier media in machine or device readable form, for example in solid-state memory or magnetic memory such as disk or tape, and processing devices utilize the programs or parts thereof to configure themselves for operation. The computer programs may be supplied from remote sources embodied in communications media, such as electronic signals, radio frequency carrier waves, optical carrier waves and the like. Such carrier media are also contemplated as aspects of the present invention.

It will thus be seen that the objects set forth above, among those made apparent from the preceding description, are efficiently attained and, since certain changes may be made in carrying out the above method and in the system set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A system for calculating the relative importance of one or more individual input variables to an overall insurance policy profitability score, comprising:
    a database for storing values for various input variables;
    a display; and
    at least one data processor configured to:
        receive an insurance policy profitability scoring formula, said insurance policy profitability scoring formula comprising a sum of a plurality of predictive input variables each having a weighting co-efficient, values for some or all said variables being stored in the database;
        calculate a score using said scoring formula and a set of input variable values corresponding to a particular proposed or actual insured insurance policy;
        calculate a partial derivative of the scoring formula with respect to each of the input variables in said set;
        calculate a deviance value for each of the input variables in said set;
        calculate the relative importance of each of the input variables in said set to a score calculated using the scoring formula by multiplying the partial derivative and deviance values for that variable;
        create a rank for each of the input variables in said set based on its relative importance to the score; and
        display the score, and one or more of said input variables in said set, its value and its rank to a user.

2. The system of claim 1 wherein the data processor further executes a software module that takes the first derivative of the scoring formula with respect to each a selected predictive input variable.

3. The system of claim 1 wherein the input variables in said set further describe characteristics of at least one of an existing policyholder and a potential policyholder, and wherein the scoring formula is used to generate a score reflective of the expected loss/premium ratio for an insurance policy.

4. The system of claim 3 wherein a premium for the insurance policy is based on the score.

5. The system of claim 1 wherein the data processor further executes a software module that receives inputs for a mean value and a standard deviation value, and the deviance value is calculated using the formula:

$$\text{Deviance of } x_i = (x_i - \mu_i)/\sigma_i$$

where $\mu_i$ is the mean for $x_i$ and $\sigma_i$ is the standard deviation for predictive input variable $x_i$.

6. The method of claim 1 wherein a score generated by the model determines the price for the insurance policy and the contribution is used to identify which of the predictive input variables had the greatest effect on the price.

7. The method of claim 1, further comprising populating the database with a mean value and a standard deviation value for each of the plurality of predictive variables.

8. The system of claim 1, wherein each of said input variables, its value and its rank is displayed to a user.

9. The system of claim 1, wherein said data processor is further configured to generate one or more insurance policy profitability scoring formulae, and to use one of them as the received scoring formula.

10. A computerized method of evaluating the relative individual contribution of one or more predictive input variables to an insurance policy profitability score, comprising:
receiving a scoring formula based on a multivariate statistical model to predict insurance policy profitability, said scoring formula comprising a sum of predictive input variables each having a weighting co-efficient;
receiving values for a set comprising a plurality of said predictive input variables wherein the received value correspond to a particular proposed or insured insurance policy;
calculating a score using the scoring formula and the received values;
calculating a partial derivative of the scoring formula with respect to each of the plurality of predictive input variables;
populating a database with a mean value and standard deviation value for each of the plurality of predictive input variables;
calculating a deviance value based on the mean value and the standard deviation value for each of the plurality of predictive input variables, wherein said calculation is performed by one of a data processor and a digital computer;
multiplying the deviance value and partial derivative value for each of the plurality of predictive input variables to determine the contribution of each of the plurality of predictive input variables to a given score;
creating a rank for each of the plurality of input variables based on its relative importance to the score; and
displaying said score, one or more of the plurality of input variables, its received value and its rank to a user.

11. The method of claim 10, further comprising defining at least one assumption for the mean value associated with at least one of the plurality of predictive input variables.

12. The method of claim 10 wherein said calculating the slope further comprises calculating the first derivative of the scoring formula with respect to the predictive variable of the plurality of predictive variables that is being analyzed.

13. The method of claim 10 wherein the deviance value is calculated as follows:

$$\text{Deviance of } x_i = (x_i - \mu_i)/\sigma_i$$

where $\mu_i$ is the mean for $x_i$ and $\sigma_i$ is the standard deviation for predictive variable $x_i$.

14. The method of claim 10, wherein each of said input variables, its value and its rank is displayed to a user.

15. The method of claim 10, further comprising generating one or more insurance policy profitability scoring formulae, and using one of them as the received scoring formula.

* * * * *

UNITED STATES PATENT AND TRADEMARK OFFICE
CERTIFICATE OF CORRECTION

| | |
|---|---|
| PATENT NO. | : 8,200,511 B2 |
| APPLICATION NO. | : 09/996065 |
| DATED | : April 9, 2013 |
| INVENTOR(S) | : Frank M. Zizzamia et al. |

It is certified that error appears in the above-identified patent and that said Letters Patent is hereby corrected as shown below:

In the claims:

Claim 6, in column 8, line 59 should be corrected as follows:

6. The method of claim "1" --10 -- wherein a score generated by the

Claim 7, in column 8, line 63 should be corrected as follows:

7. The "method" -- system -- of claim 1, further comprising "populating" -- populate --

Claim 10, in column 9, line 13 should be corrected as follows:

predictive input variables wherein the received "value" -- values --

Signed and Sealed this
Twentieth Day of May, 2014

Michelle K. Lee
*Deputy Director of the United States Patent and Trademark Office*